United States Patent [19]

Cavallo

[11] Patent Number: 5,417,148
[45] Date of Patent: May 23, 1995

[54] APPARATUS FOR DRY-COOKING FOOD PRODUCTS

[76] Inventor: Vincenzo Cavallo, Via Gabelli, 14, Rimini, Italy

[21] Appl. No.: 157,196
[22] PCT Filed: Apr. 20, 1993
[86] PCT No.: PCT/IT93/00036
§ 371 Date: Dec. 8, 1993
§ 102(e) Date: Dec. 8, 1993
[87] PCT Pub. No.: WO93/21809
PCT Pub. Date: Nov. 11, 1993

[30] Foreign Application Priority Data

Apr. 23, 1992 [IT] Italy ................. BO92A0149

[51] Int. Cl.⁶ .................. A47J 37/04; A47J 37/12
[52] U.S. Cl. ........................... 99/334; 99/345; 99/357; 99/409; 99/427; 99/450; 99/476; 99/516; 126/21 A; 219/389; 219/400
[58] Field of Search ............ 99/348, 345, 443 R, 99/443 C, 427, 357, 450, 403, 476, 409, 477-479, 407, 334, 335; 366/277, 234; 221/150 A, 150 R, 150 HC; 126/21 A; 219/400, 389; 426/243, 519, 523

[56] References Cited

U.S. PATENT DOCUMENTS

| | | | |
|---|---|---|---|
| 1,733,766 | 10/1929 | Wilkowski | 99/427 |
| 2,705,450 | 4/1955 | Steinbook | 99/427 |
| 2,939,383 | 6/1960 | Kanaga | 99/427 X |
| 3,870,193 | 3/1975 | Schneider | 99/443 R |
| 4,238,997 | 12/1980 | Hengstenberg | 99/483 |
| 4,304,177 | 12/1981 | Loeffler et al. | 99/427 |
| 4,410,553 | 10/1983 | McGinty | 99/348 |
| 4,865,864 | 9/1989 | Rijswijck | 219/400 |
| 5,134,927 | 8/1992 | McCarthy, III et al. | 99/450 |
| 5,168,797 | 12/1992 | Wang | 99/348 |
| 5,193,444 | 3/1993 | Bar-Sheshet | 99/443 R |

Primary Examiner—Timothy F. Simone
Attorney, Agent, or Firm—Dvorak and Traub

[57] ABSTRACT

An apparatus for dry-cooking food products, having a thermo-ventilated cooking chamber (35) and a rotatable container (2) for food products, internal to the cooking chamber (35), with rotatably supported holed walls (8), which retains and mixes the food products. The container (2) is interpositioned between loading and unloading stations (90, 91) of the products positioned at levels respectively overlying and underlying the container (2), has a single opening (13) with a hatch (12), mobile from an initial open position in which the opening (13) is turned towards the loading station (90), to an intermediate closed position in which the container (2) rotates, to a final open position in which the opening (13) is turned towards the unloading station (91). The container (2) is blocked by rotation stop means (6). The apparatus (1) also comprises command means (7) of the activating and stop means (5, 6).

19 Claims, 5 Drawing Sheets

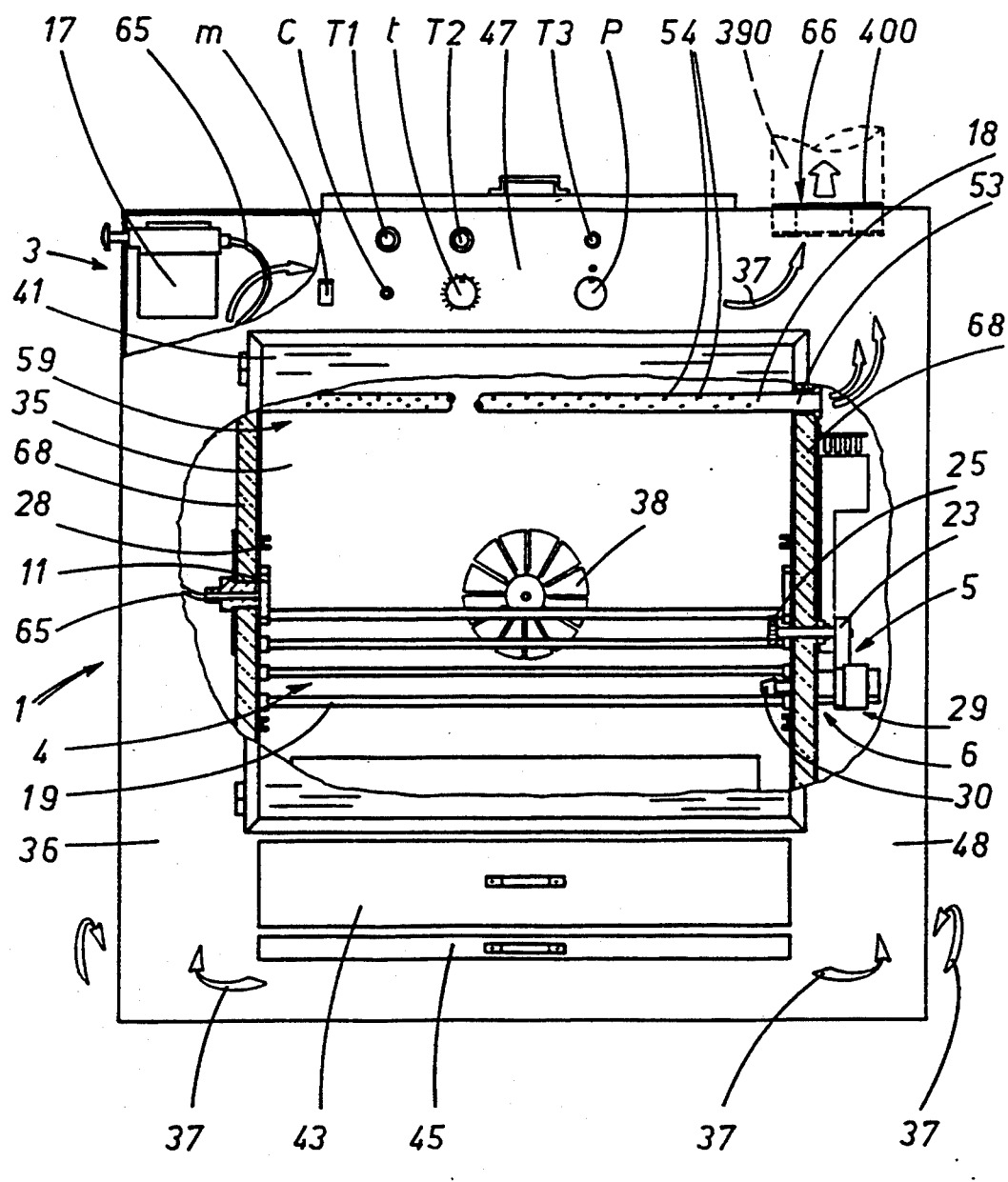

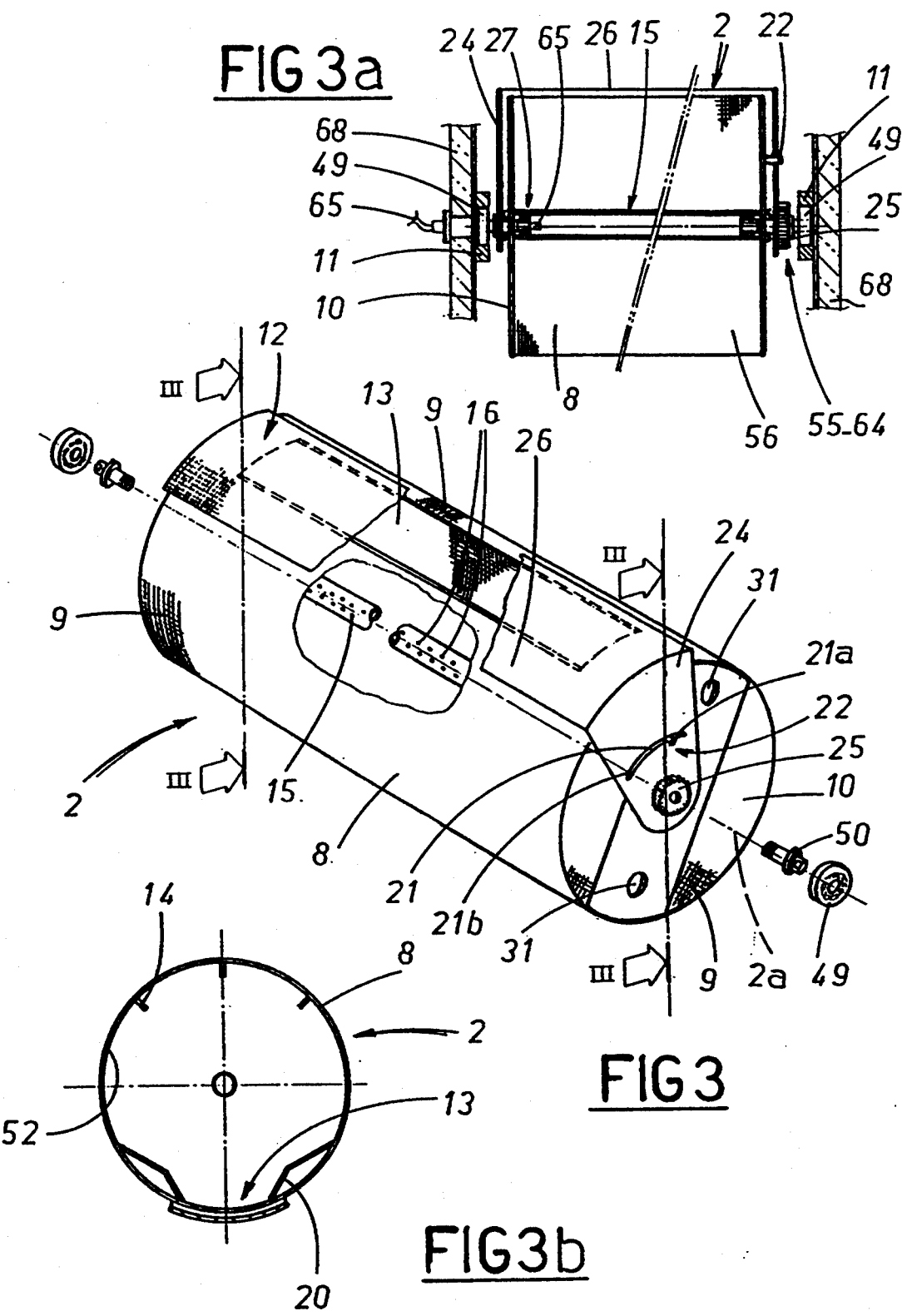

APPARATUS FOR DRY-COOKING FOOD PRODUCTS

TECHNICAL FIELD

The invention refers to an apparatus for dry-cooking food products, of the type comprising:

a thermo-ventilated cooking chamber, with a relative access hatch;

a container for food products, arranged internally to the cooking chamber, having at least one holed wall so as to afford access to air, rotatably supported about its own symmetry axis, retaining and contemporaneously mixing the food products inside it during the cooking process;

activating means of the container rotation.

In the industrial catering sector, the prior art embraces cooking apparatus which cyclically cook the food products by means of direct immersion of the products themselves in an oil bath, which oil has been previously brought up to a high temperature.

After an appropriate time in the oil bath, the cooked products are extracted and shaken free of the oil remaining on them and sent for consumption. The introduction of a new quantity of products to be cooked causes a new operative cycle of the cooking apparatus to start.

BACKGROUND ART

The prior art also embraces cooking apparatus (see French Patent 1,578,666 and French Patent no. 2,324,269) which dry-cook the food products.

The first of the above patents refers to an apparatus comprising, internally to the thermoventilated cooking chamber, a perforated cylindrical container, rotating about a horizontal axis and having a single opening for the loading and the unloading of the food products, which opening is accessible to the operator frontally through a vertical hatch arranged on a wall of the container.

In the second above patent document, the apparatus comprises a container, substantially cylindrical and having two distinct openings: one frontal and destined to be used for the loading of the food to be cooked, accessible through the hatch of the chamber, the other made on the lateral surface of the container, having the purpose of allowing the cooked food to be unloaded, on to an underlying drawer, by means of inversion in the rotation direction of the container.

The above-mentioned cooking apparatus, independently of their operative principles, are characterised by numerous drawbacks.

A first, common drawback, both in the apparatus envisaging immersion of the products and in the apparatus operating drily, in which however the food products are still coated with oil, is constituted by the fact that the food products are substantially coated with the cooking oil and can be indigestible and damaging for the health of the consumers if the cooking temperature falls for any reason whatsoever below a prefixed limit value, which value is characteristic for each food product (for example the said limit for chipped potatoes is about 190 degrees C.

A further drawback of the machines operating by immersion is constituted by the fact that the oil in the oil bath is repeatedly re-used, apart from the normal additions made for oil lost, so that after a certain operative time the oil tends to degrade, with the formation of toxic substances that, even in the best of cases, determines a fall in the organic characteristics of the cooked products. Also, the consumer of the food cannot perform any check on the healthiness of the products which he or she is eating, and has to trust in the good practices of the operative who is charged with the regular substitution of the entire contents of the oil bath of the apparatus.

The machines operating by immersion are also negatively characterised by a considerable inertia when they are first activated.

The necessity to constantly maintain the optimal temperature, as above-mentioned, is particularly critical in the apparatus which dry-cook, made according to the teachings provided in the above-mentioned documents.

Indeed, in the said apparatus, each time that the hatch of the thermo-ventilated chamber is opened in order to introduce a new quantity of food into the container, the air which is inside the container exits at a high temperature and strikes the operator, causing an unpleasant and even dangerous experience for the operator, who must guard against burns because of the said high temperature.

This rush of exiting air, furthermore, causes a disadvantageous lowering of the internal temperature of the chamber, which falls below the optimal value and causes an increase in cooking times and a loss of energy in the apparatus.

A further characteristic drawback existing in the apparatus of U.S. Pat. No. 2,324,209 is represented movement preliminary to unloading, the cooked products are subjected to a jolt consequent to the sudden variation in the curvature of the walls.

The jolt causes in all cases a certain deterioration in the product and, in the case of crispy or frail foods, is the cause of a considerable amount of waste due to the breaking of the products.

DISCLOSURE OF INVENTION

The aim of the present invention, as it characterised in the claims, is thus that of eliminating right from the start the above-mentioned drawbacks by means of an automatic apparatus for dry-cooking food products or, as will be seen in the following description, food products sprayed measuredly with oil.

The apparatus according to the invention principally solves the problem of avoiding, on each occasion, sudden drops in temperature, especially between one cooking cycle and another, during a new introduction of foods to be cooked. Furthermore, each introduction of new foods to be cooked or each extraction or unloading of the cooked products is contemporaneously greatly facilitated.

One of the advantages obtained by means of the present invention consists essentially in the fact that the apparatus, due to its special structure, permits of maintaining at practically constant values the temperatures characteristic of cooking even during the introduction of new foods, so that the cooking of the said foods is performed using shorter cooking cycles, requiring only short pre-heating times or indeed no pre-heating at all.

The food products are introduced for cooking and extracted after cooking without the cooking chamber ever coming into communication with the outside. Furthermore, both the introduction of the food products to be cooked, and the extraction of the same products once cooked, happens with great simplicity, their introduction and extraction being effected by force of gravity and in a continuous cycle, without its being necessary to open the access hatch of the cooking chamber, usable only to extract, from the said chamber, the rotating food container, for its periodic cleaning.

A further advantage is constituted by the fact that, by the same apparatus functional principle, it is not necessary to recuperate and/or recirculate the used oil. This permits of cooking, when it is intended to use oil or like condiments, using only fresh oil, never previously used, for all of the food introduced in the successive cooking cycles. The consequence of this is that apart from better organic qualities, the characteristics are constant throughout the functioning time of the apparatus.

A further advantage of the invention is offered by the fact that the container is rapidly and easily extractable from the cooking chamber to enable an easier and more complete cleaning both of the container and of the entire apparatus.

Further characteristics and advantages of the present invention will better emerge from the detailed description that follows, of an embodiment of the invention, herein illustrated purely in the form of a non-limiting example in the accompanying figures, in which:

FIG. 1 shows an apparatus according to the present invention represented in total frontal view with some parts removed better to evidence others;

FIG. 3 is a total perspective view of some particulars removed form FIG. 1;

FIG. 3a is a section view according to arrows III-—III of FIG. 3;

FIG. 3b is a lateral view in section of a particular of FIG. 3;

Figure 1A:
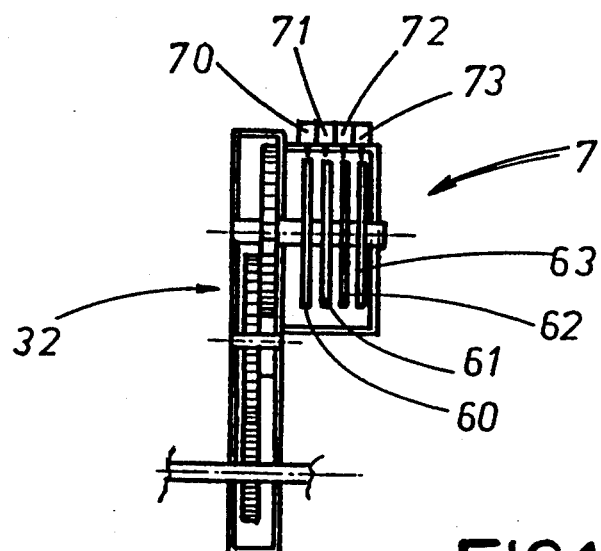
FIG. 1a shows, in transversal section, a special programmable device represented in the apparatus of FIG. 1.

With reference to the drawings, it can be observed that the invention essentially consists of an apparatus 1 for dry-cooking food products of differing kinds, in particular chipped potatoes or like products cut into small-dimension pieces.

Figure 2A:
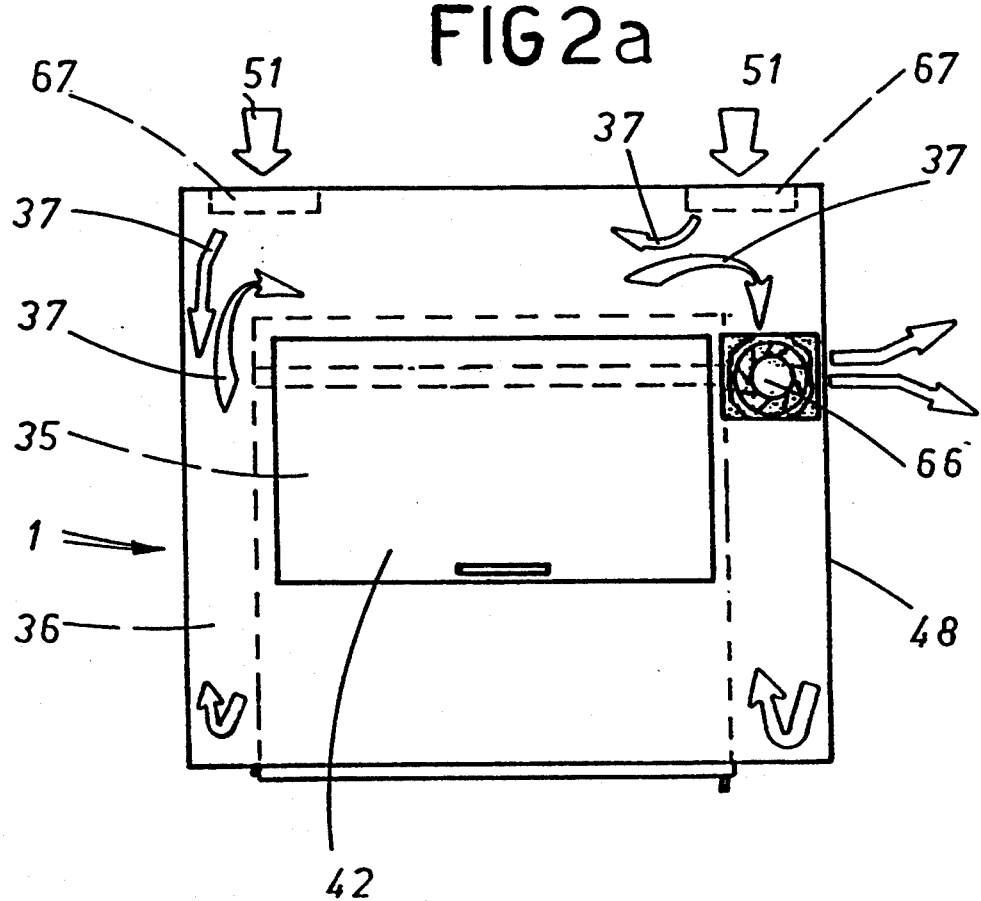
FIG. 2a shows a plan view of the apparatus according to the invention.

The apparatus 1 essentially comprises (see FIGS. 1, 2, 3):

a thermo-ventilated cooking chamber 35 with a relative access hatch 41;

a container 2 for the food products to be cooked (FIG. 3), contained in the cooking chamber 35, motorised and rotatably supported about its own axis 2a;

an oil spraying device 3, if small quantities of oil are desired in the cooking, associated to the container 2 in such a way as to spray the food products during the cooking;

heating means 4 of the container 2 (FIGS. 1, 3);

activating means 5 of the rotation of the container 2 (FIG. 3);

stop means 6 of the container 2 rotation (FIGS. 1, 3) in the exact introduction and extraction position of the food products;

circulating means 51 of an air flow 37 internally to the apparatus 1 (FIGS. 1, 2a);

extraction means 59 of cooking fumes (FIGS. 1, 2a);

sequence command means 7 of the operative phases of the apparatus (FIG. 1a).

The container 2 is advantageously interpositioned between a food product loading station 90, positioned at a level overlying the container 2, and between a food product unloading station 91 positioned at a level underlying the container 2.

The container 2 (FIG. 3) is metallic and has a solid axial-symmetrical shape, and preferably is constituted by a cylinder arranged with its symmetry axis 2a horizontal.

The container 2 is equipped with a lateral wall 8 with openings 9 of a smaller dimension than the dimension of the food products, which openings 9 allow contact with air. There are also two disc-shaped walls 10, also equipped at least partially with openings 9, which disc-shaped walls 10 are supported at their their centre at the position of the axis 2a, by rotatable supports 11 which bilaterally support the container 2 on two opposite walls 68 of the cooking chamber 35.

A single opening 13 with substantially a rectangular plan, is made in the lateral wall 8, which opening 13 is closable by a suitable hatch 12 used both for the introduction and for the extraction of the food products.

The container 2 is mobile from an open initial position in which the opening 13 is turned towards the loading station 90, to a second intermediate closing position during which the container 2, by means of the activating means 5, rotates in order to cook the food products, to an open third and final position, in which the opening 13 is turned towards the unloading station 91 and the container 2 is blocked in the said position by stop means 6 of the container 2 rotation in the exact position of introduction and extraction of the food products.

During its rotation, the container 2, having the food product to be cooked inside it, determines the said food's continuous mixing and, with the aim of intensifying this action, envisages (see FIG. 3b) also mixing elements 14 which project radially and are distributed on the internal side 52 of the lateral wall 8. Further, the said container 2 has, also internally to it, shaped walls 20 for the guiding of the food products towards the opening 13, during the extraction phase of the cooked products.

The hatch 12 (FIG. 3) has a shaped central part 26 complementary to the lateral wall 8 of the container 2 and is equipped bilaterally with two brackets 24 which are solid to the said central part 26.

The brackets 24 (FIG. 3a) are rotatably coupled to a pivot 50 arranged on supports 11, on which pivot 50 also the disc-shaped walls 10 of the container 2, equipped with bearings 49, are keyed, though independently of the brackets 24.

The supports 11 (FIG. 2) are U-shaped and are connected to the walls 68 of the cooking chamber by means of screws 39.

Figure 2:
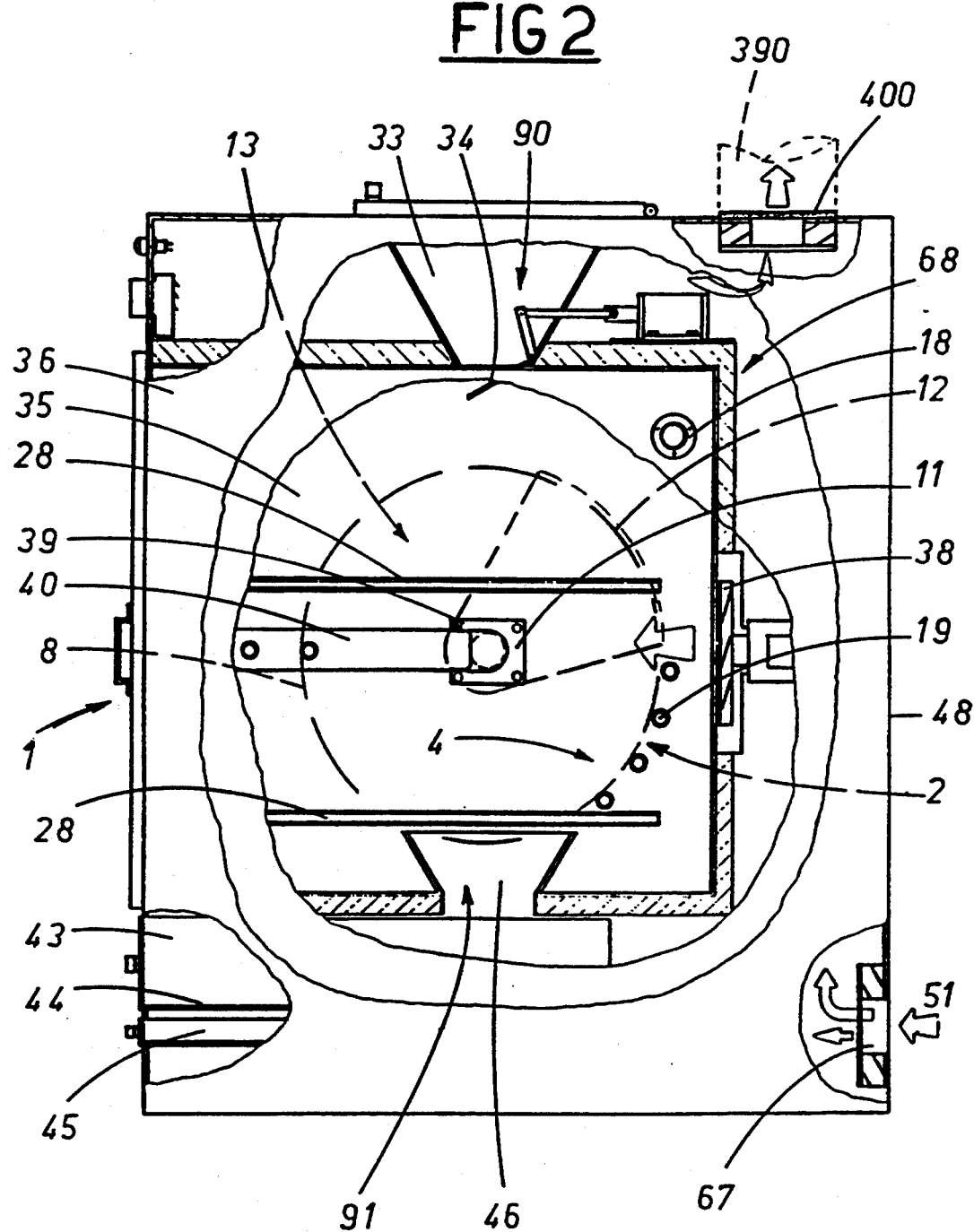
FIG. 2 shows the apparatus of FIG. 1 in a side view with some parts removed better to evidence some internal particulars.
Figure 4A:
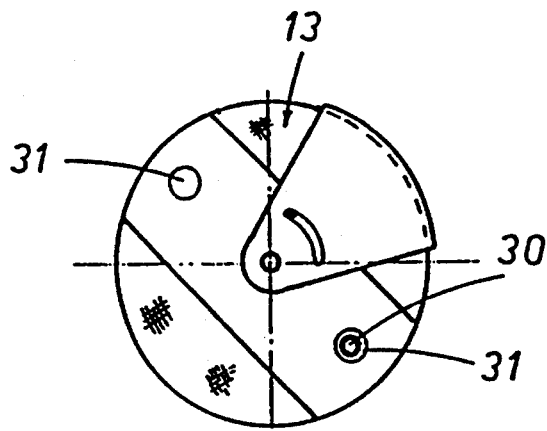
FIG. 4 shows, by means of a schematic representation, a characteristic operative sequence of the apparatus.
Figure 4B:
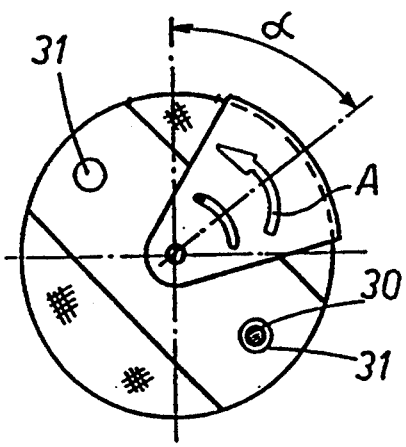
Figure 4C:
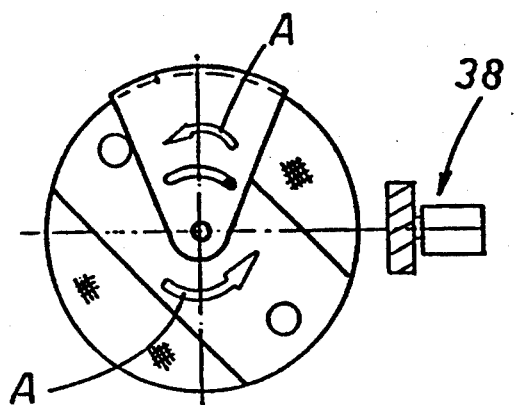
Figure 4D:
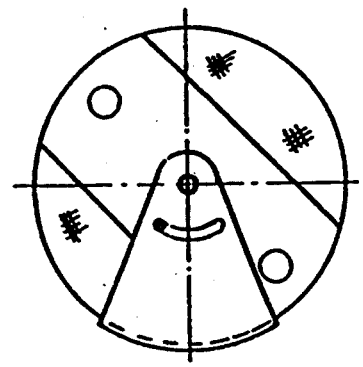
Figure 4E:
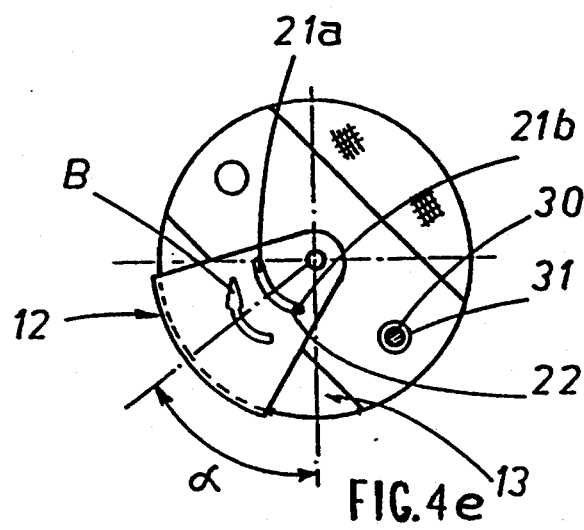
Figure 4F:
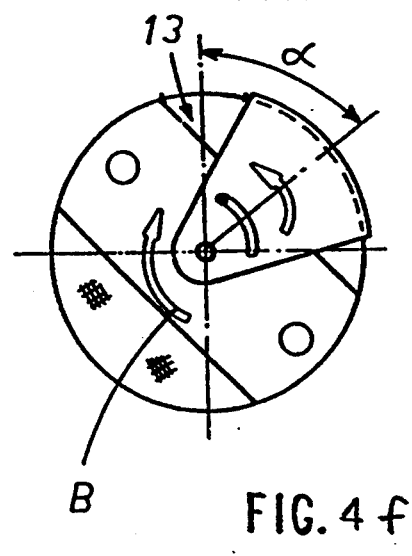

The bearings 49 are blocked on the respective supports 11 by means of a rod 40, guidable and blockable on the wall 68, acting on the open side of the U. This conformation of the supports 11 permits of easy and rapid extractability of the container 2 from the cooking chamber 35, through the access hatch 41, in order to perform the cleaning of the apparatus 1, or also in order to use the apparatus 1 as a tradtional oven. For this purpose, as can be seen in FIG. 2, internally to the cooking chamber 35 there are guides 28 destined to support grills or cooking planes of foods.

Both the hatch 12 and the container 2 are rotatable about the common pivot 50 and, being rotatable about the axis 2a of symmetry of the container 2, are also able to move one relatively to the other. During such a relative movement, the hatch 12 is constantly equidistant from the lateral wall 8 of the container 2.

The hatch 12 is further equipped with a slot 21, made in at least one of the brackets 24 and arranged on a circumference arc.

Internally to the slot 21 a pivot 22 is slidably coupled, which pivot 22 is solid to the disc-shaped walls 10 of the container 2.

The pivot 22, during the relative movement of the hatch 12 with respect to the container 2, is mobile between two opposite ends 21a, 21b of the slot 21: at a first end 21a the hatch 12 is overlying the opening 13 of the container 2 in such a way as to close it, while at the other slot end 21b the hatch 12 is angularly displaced from the opening 13 in such a way as to permit the free transit of the food products.

In a preferred embodiment of the apparatus 1, the slot 21 and the pivot 22 are dimensionally correlated so as to permit a maximum angular amplitude of 67 degrees of the hatch 12 with respect to the container 2. Further, for reasons which will be better evidenced below, a clutch device 55 is located between the brackets 24 of the hatch 12 and the disc-shaped walls 10, which clutch device 55 is constituted by a Belleville washer which tends to enclutch the relative movement of the hatch 12 with respect to the container 2.

Superiorly to the cooking chamber 35, at the loading station 90, the apparatus 1 further comprises (see FIG. 2) a loading hopper 33 of the food products into the container 2, equipped with an open-shut valve 34 which opening is commanded in a special operating sequence, commanded by the sequence command means 7, when the container 2 is arranged with its opening 13 on the vertical of the loading hopper 33 and adjacent to the open-shut valve 34.

Above the hopper 33 the loading station 90 is equipped with a closing and insulating hatch 42, operatively associated with the motorised open-shut valve 34 so as to minimise the exit of hot air from the cooking chamber 35, each time that the container 2 is to be loaded with new products. Indeed, observing FIG. 2, it can be understood that, after having lifted the hatch 42, while the open-shut valve 34 is still closed, the operator can proceed in conditions of great safety and without determining an exit of heat from the cooking chamber 35, to the loading of the loading hopper 33. Once the the hatch 42 has been closed and the open-shut valve 34 opened, the contents of the loading hopper 33 are unloaded into the container 2, while the exit of hot air is substantially prevented by the products themselves which, on falling, obstruct the passage section of the opening 13 of the container 2.

The oil spraying device 3 comprises a tube 15 (FIG. 3) having a plurality of transversal holes 16, arranged internally to the container 2 and constrained, at its ends 27, to the pivots 50 of the supports 11 at the rotation axis 2a of the container 2.

The tube 15 is stationary to the inside of the container 2 and is interconnected to an oil feed pump 17, arranged externally to the cooking chamber 35 and equipped with a delivery tube 65 crossing a wall 68 of the chamber, as well as the pivot 50 of one of the supports 11 (FIGS. 1, 3a).

The transversal holes 16 of the tube 15 are made, preferably, at the lower arc of the tube 15, so as to orient the oil flow only towards the lower part 56 of the container 2, in which the products tend to collect due to the force of gravity.

The heating means 4 of the apparatus 1, destined to provide the heat for the cooking of the food products, are constituted by straight, bar-type electrical resistors 19, located in the cooking chamber 35, externally and laterally to the container 2 at the lower part 56 of the the said container 2. This is so as to localise more the thermal concentration at the container 2 zone in which the food products are principally situated, as well as to favour the convection movement of the cooking chamber 35.

The electrical resistors 19 are separately screwable so as to enable the partialisation of the thermal concentration furnished by the apparatus 1.

The activating means 5 of the container 2 rotation and the relative movement of the hatch 12 (FIG. 1) are of the single body type and comprise a conventional ratiomotor 23 which external gearwheel 25 is solid to a bracket 24 of the hatch 12. The ratiomotor 23 is kinematically directly connected to the hatch 12 of the container 2 so as to draw it into rotation with respect to the supports 11.

The rotation stop means 6, associated directly to the container 2, comprise (FIG. 1) an electromagnetic brake 29 acting on one of the disc-shaped walls 10 of the container 2.

The said electromagnetic brake 29 has an axially mobile pin 30 destined to associate with a corresponding seating 31 made frontally to the pin 30 on one of the disc-shaped walls 10.

FIG. 3 shows that there are two seatings 31 and that they are symmetrically arranged with respect to the axis 2a of the container 2.

The deactivation of the electromagnetic brake 29 corresponds to the retracted position of the pin 30 in the seating 31 and thus to the free rotation possibility of the container 2 on the supports 11; the activation of the electromagnetic brake 29 and the consequent rotation inhibition of the container 2 correspond to the advanced position of association of the electromagnetic brake 29 with the seating 31.

The clutch device 55, constituted by the Belleville washer, operates functionally as a transmission means 64 of the hatch 12 motion with respect to the container 2, thus permitting, with single activating means 5, as will become more evident during the following functional description of the apparatus 1, both the closing and the opening of the hatch 12, as requested for the functioning of the apparatus 1, and the drawing into rotation of the container 2 during cooking.

With reference to FIG. 3, it can be understood that by activating the activating means 5 and the stop means 6, the hatch 12, within the limits of mobility permitted to the pivot 22 by the ends 21a and 21b of the slot 21, can move so as to open, close or draw the container 2 in rotation.

Indeed, the opposite ends 21a, 21b of the slot 21 determine limit positions for the pivot 22 which enable a correct phase displacement angle between the hatch 12 and the container 2 rotation.

The said phase displacement angle permits, starting from an initial position of the container 2, which is open to receive a load of food product, of retardedly activating the container 2 rotation with respect to the movement of the hatch 12, so as to close the container 2 before it is drawn into rotation. On the contrary, it permits of anticipating the stop of the container 2 rotation with respect to the hatch 12 so as to allow the opening of the container 2 in an unloading position of the cooked products, which position is diametrically opposed to the preceeding position (FIG. 3b).

Externally to the cooking chamber 35, the apparatus 1 has a hollow space 36 which peripherally envelops the container 2 (see FIGS. 1, 2, 2a) which hollow space 36 is internally described by the walls 68 of the cooking chamber 35 and externally described by a shell 48 which contains the entire apparatus 1.

An air flow 37 circulates in the hollow space 36, guided by accelerating means 51 between a cold air intake section 67, located at the base of the shell 48, and a hot air outlet section 66 of the air heated by the heat removed from the cooking chamber 35, located at the top of the shell 48.

One of the aims of the air flow 37 is that of cooling the apparatus 1 so as to allow it to contact the shell 48 without any danger of causing burns to the user of the apparatus 1; for this reason the air flow 37 is guided all around the cooking chamber 35.

In the hollow space 36, in a zone underlying the cooking chamber 35, a drawer 43 is provided for the collection of the cooked food exiting from the container 2 and guided by a shaped conveyor 46 placed between the drawer 43 and the cooking chamber 35.

The drawer 43 intercommunicates with the hollow space 36 at a zone where the air flow 37, specially deviated, is sufficiently heated so that by being struck by the said air flow 37, the cooked food products contained in the drawer 43 can be kept hot while they are in the said drawer 43.

The drawer 43 further exhibits a holed bottom 44, inferiorly to which a second drawer 45 is located, the aim of which drawer 45 is to collect the waste bits from the food product which are generated during the cooking procedure.

The apparatus 1, on a wall 68 of the cooking chamber 35 opposite to the frontal access hatch 41, is equipped with an air ventilator 38 located in proximity to the electrical resistors 19. The air moved by the ventilator 38, sent on to the electrical resistors 19, improves the thermal emission of the said electrical resistors 19 and, crossing the lateral wall 8 of the container 2, conveys the heat on to the products to be cooked.

Thus it can be seen that, the container 2 lateral wall 8 being heated both by thermal irradiation and by convection of the heat emanating from the heating means 4, a further advantage of the invention is constituted by a more rapid cooking. The advantage is particularly effective during the cooking of thin sliced chipped potatoes.

The extraction means 59 of the cooking fumes are associated to the cooking chamber 35 and the hollow space 36 in such a way as to transfer the fumes, mixing them with the air flow 37 which circulates there. In this case, in order to avoid foul-smelling emissions into the atmosphere where the apparatus 1 is functioning, downstream of the outlet section 66 of the hollow space 36 there is a chimney 390, equipped with a filter 400, which externally collects the air and the cooking emissions.

The extraction means 59 comprise at least one collection tube 18 of the cooking fumes equipped with a plurality of transversal holes 54, which tube 18 is arranged internally to the cooking chamber 35 so as to collect the fumes and internally convey them, towards an outlet section 53 of the collection tube 18, situated on the hollow space 36.

The sequence command means 7 of the apparatus 1 comprise (FIGS. 1, 1a) a mechanical (or electronic) cam (60, 61, 62, 63) programmer 32 and microswitches (70, 71, 72, 73) which are functionally associated to the ratiomotor 23 and the electromagnetic brake 29, as well to the opening and closing command of the hatch 12.

The said sequence command means 7 also comprise at least one start-cycle switch m, timers (T1, T2, T3) and a thermostat t.

In order better to understand the functioning of the apparatus 1, and the relative sequence command means 7, and with reference to FIG. 4, the following is a description of the characteristic phases of a typical operative sequence.

In the phase in FIG. 4 I), which coincides with the initial phase of an operative cycle, the container 2 is located in such a way as to exhibit its opening 13 vertically and in proximity to the loading hopper 33. The container 2 is open and the hatch 12 is in phase displcement with respect to the opening 13 at the meeting of the pivot 22 with the second end 21b of the slot 21: the microswitch 70 is intercepted by the relative cam 60.

In the phase shown in FIG. 4 II), in which the apparatus 1 maintains all of the described positions descrined in the preceding phase, following the activation of the start-cycle switch m located on a control panel 47 (FIG. 1) situated on the shell 48, the electrical resistors 19 are activated.

Once the working temperature has been reached, which is controlled by the thermostat t, the said temperature, together with the signal of the microswitch 70, determines the activation of the electromagnetic brake 29 of the container 2, with the association of the pin 30 with one of the seatings 31 and the consequent blocking of the container 2. The electromagnetic brake 29 command activates the opening of the open-shut valve 34 of the loading hopper 33, timed by the timer T1 with a consequent introduction into the container 2 of a certain quantity of food to be cooked, while the timer T2 activates the ratiomotor 23 after a time interval which is equal to or slightly greater than the opening time of the loading hopper 33, so that, once the loading of the product to be cooked has been completed, and while the container 2 is still braked, the hatch 12 begins to rotate, according to the direction A of the arrow in FIG. 4 II), closing the container 2.

In the phase in FIG. 4 III), when the hatch 12 has described the correct angle alpha (preferably 67 degrees), at which the container 2 is perfectly closed, the cam 61 intercepts the corresponding microswitch 71 which deactivates the electromagnetic brake 29 command, so that while the pivot 22 has correspondingly come to meet the first end 21a of the slot 21, the drawing in rotation of the container 2 begins in the direction indicated by the arrow A.

Contemporaneously the ventilator 38 is activated. The container 2 rotates for a pre-established number of rotations, selectionable on the control panel 47 by means of a three-position programmer P to which three different cooking intervals (for example 5, 10, 15 minutes) correspond. At each characteristic position of the programmer P a well-established number of container 2 rotations correspond, at the end of which rotations the container 2 ihas its opening 13 in a displaced position of 180 degrees with regard to the loading position of the products to be cooked (see FIGS. 4 III) and 4 IV) corresponding to the start and end of the container 2 rotation).

A halfway through each selected cooking cycle, the pump 17, with a suitable timer T3, or with equivalent means constituted for example by a cam and relative microswitch on the programmer 32, is activated with a consequent spraying of oil on the cooking products.

When the container 2 has reached the said end-rotation position, displaced that is by 180 degrees, the phase in FIG. 4 IV) begins, activating the unloading cycle of the cooked products. At this position of the hatch 12, the intercepting of the microswitch 72 occurs on the part of the relative cam 62, which determines the activation of the electromagnetic brake 29, the stop of the ratiomotor 23, the immediate restarting of the ratiomotor 23, but this time with a rotation direction as indicated by arrow B, contrary to the preceding direction indicated by arrow A, causing the phase of FIG. 4 V) to start.

In the said phase of FIG. 4 V), while the container 2 is kept braked, the hatch 12 described angle alpha, consequently determining the discovery of the opening 13 and the unloading of angle alpha, consequently determining the discovery of the opening 13 and the unloading of the cooked products. Once the limit position has been reached, in which the pivot 22 meets with the second end 21b of the slot 21, the microswitch 73 is activated by the corresponding cam 63 which commands the unblocking of the electromagnetic brake 29 which was holding the container 2 still, and the successive phase begins.

In the phase in FIG. 4 VI), the hatch 12, continuing to rotate in the direction indicated by arrow B for another 180 degrees, draws the container 2 towards the start-cycle position. When the container 2 is positioned in such a way that the relative opening 13 comes into position below the loading hopper 33 vertical position, in the loading position of the products, the container 2 is blocked by the activation of the electromagnetic brake 29 with the hatch 12 newly in the start-cycle position as represented in FIG. 4 I), from which point the cycle is repeated with the same modalities as just described.

The invention as it is conceived herein is susceptible to numerous modification and variations, all entering into the field of the inventive concept. Furthermore, all of the details can be substituted with others that are technically equivalent. For this purpose, it can be seen from FIG. 1 that the control panel 47 is further equipped with a commutator C to employ the apparatus 1 to cook just like a traditional oven. Also, on the supports 11 a traditional spit can easily be mounted, with only very small adaptations being necessary.

I claim:

1. An apparatus for dry-cooking food products, the apparatus comprising:
   a thermo-ventilated cooking chamber (35), with an access hatch (41);
   a container (2) for retaining and mixing food products, the container disposed in the cooking chamber (35), the container having an opening (13) with a closable hatch (12), and an air hole (9), wherein the container is rotatably supported about a symmetry axis (2a);
   a food product loading station (90) disposed above the container (2);
   a food product unloading station (91) disposed below the container (2);
   activating means (5) for rotating the container (2) about the symmetrical axis, wherein the container is rotatable from a first initial open position, in which the opening (13) is adjacent to the loading station (90), and a second intermediate closed position during which the container (2) is rotated while cooking the food products, and a final third open position, in which the opening (13) is adjacent to the unloading station (91),
   stop means (6) for stopping the container (2) rotation in the first open position, and in the third open position; and
   sequence command means (7) for controlling the activating means (5) and the stop means (6).

2. An apparatus as in claim 1, characterized in that the loading station (90) comprises a loading hopper (33) for loading the food products, which loading hopper (33) is disposed over the opening (13) and is equipped with a motorized open-shut valve (34) to intercept the food products, the open-shut valve activatable on the command of the sequence command means (7).

3. An apparatus as in claim 1, characterised in that the said cooking chamber (35), containing the said container (2), is at least partially circumscribed by an heat-insulating hollow space (36) internally to which an air flow (37) circulates, which air flow is activated mechanically between a cold air intake section (67) through which cold air is introduced into the hollow space (36), and an outlet section (66) from which hot air flows.

4. An apparatus as in claim 1, further comprising an oil spraying device (3) directed toward the container (2) to periodically spray food products contained in the container (2).

5. An apparatus as in claim 1, wherein the container (2) is sustained by supports (11), characterized in that the hatch (12) is hinged to the supports (11), and is rotatable about the symmetry axis (2a) of the container (2) while maintaining an equidistant position from the wall (8), the hatch (12) comprising a slot (21) internally to which a pivot (22) is slidably coupled, which pivot (22) is solid to the container (2) and mobile relatively to the hatch (12) between two opposite ends (21a, 22b) of the slot (21), at a first end (21a) of which slot (21) the hatch (12) overlies the opening (13) and closes the container (2), while at another end (21b) it is angularly displaced from the opening (13) to permit the food to transit freely.

6. An apparatus as in claim 1, characterised in that the stop means (6) are directly associated to the container (2) in such a way as to inhibit its rotation, the hatch 12 being kinematically connected to the activating means (5), the apparatus (1) comprising transmission means (64) of movement between the container (2) and the hatch (12) to permit, successively to a deactivation of the stop means (6), a drawing in rotation of the container (2) by means of the hatch (12), the activating means (5) being single for the rotation of the container (2) and the movement of the said hatch (12).

7. An apparatus as in claim 1, characterised in that the stop means (6) comprise an electromagnetic brake (29) intercting with the container (2).

8. An apparatus as in claim 1, characterized in that the sequence command means (7) comprise a cam programmer (32) and micro-switches (70, 71, 72, 73) which are functionally associated to the activating means (5) and the stop means (6).

9. An apparatus as in claim 1, comprising at least one drawer (43) for the collection of the cooked food products, disposed below the container (2) and intercommunicating with the cooking chamber (35) to keep the food products contained within hot, the apparatus (1) being characterized in that the drawer (43) is equipped with a holed bottom (44) and overlies a second drawer (45), the holed bottom (44) permitting the separation by force of gravity of broken bits of waste food product, broken off during the cooking and falling into the second drawer (45).

10. An apparatus as in claim 2, characterized in that the loading hopper (33) is equipped with a closing and insulating hatch (42), operatively associated with the motorized valve (34) to minimize the exit of hot air from the cooking chamber (35).

11. An apparatus as in claim 3, of the type comprising extraction means (59) of cooking fumes associated with the cooking chamber (35), characterized in that the said extraction means (59) are interconnected with the hollow space (36) to transfer the fumes from the cooking chamber (35) to the air flow (37) circulating in the hollow space (36).

12. An apparatus as in claim 4, characterized in that the oil spraying device (3) comprises a holed tube (15) having a plurality of transversal holes (16), arranged internally to the container (2) and constrained to the supports (11) at the rotation axis (2a) of the container (2), the tube (15) being interconnected with an oil feed pump (17) equipped with a delivery tube (65) crossing one of the supports (11).

13. An apparatus as in claim 5, characterized in that the supports (11) are U-shaped and house a support bearing (49) for the container (2), the bearing (49) being blockable at an open side of the U by a stop-rod (40) guided and blockable on a wall (68) of the cooking chamber (35).

14. An apparatus as in claim 6, characterized in that the activating means (5) comprise a ratiomotor (23) directly and kinematically connected to the hatch (12) to impress rotation movement on the hatch (12) on the supports (11), also drawing in rotation the container (2) after having described a determined angular displacement with respect to the container (2).

15. An apparatus as in claim 6, characterized in that the hatch (12) comprises a slot (21) internally to which a pivot (22) is slidably mobile and solid to the container (2), opposite ends (21a, 21b) of the slot (21) determining limit travel positions of the pivot (22) to determine, on the combined action of the activating means (5) and the stop means (6), an angular displacement between the rotation of the hatch (12) and the rotation of the container (2), the angular displacement permitting of activating a retarded container (2) rotation with respect to the movement of the hatch (12) in a closing phase of the container (2), and an advance arresting of the container (2) rotation with respect to the hatch (12) during an opening phase of the container (2).

16. An apparatus as in claim 6, characterised in that the transmission means (64) comprise a clutch device (55) interpositioned between the hatch (12) and the container (2).

17. An apparatus as in claim 7, characterized in that the electromagnetic brake (29) comprises an axially mobile pin (30), associable with at least one seating (31) frontally arranged on the container (2), the pin (30) being mobile from a retracted position of free rotation of the container (2) to an advanced position of association with the seating (31), to which position the rotation stop corresponds.

18. An apparatus as in claim 11, characterised in that the extraction means (59) comprise at least one collection tube (18) of cooking fumes equipped with a plurality of transversal holes (54), the tube (18) being arranged internally to the cooking chamber (35) in such a way as to collect the fumes, conveying them internally towards an outlet section (53) of the collection tube (18) abutting into the hollow space (36).

19. An apparatus as in claim 12, characterized in that the transversal holes (16) of the tube (15) are made at least along a bottom arc of the tube (15) to direct the oil flow only towards the lower part (56) of the container (2).

* * * * *